United States Patent [19]

Tanaka et al.

[11] Patent Number: 5,070,975

[45] Date of Patent: * Dec. 10, 1991

[54] VISCOUS CLUTCH ASSEMBLY FOR TORQUE TRANSMISSION IN MOTOR VEHICLE

[75] Inventors: Koichi Tanaka, Misima; Kiyohito Murata, Susono, both of Japan

[73] Assignee: Toyoto Jidosha Kabushiki Kaisha, Toyota, Japan

[ * ] Notice: The portion of the term of this patent subsequent to Aug. 6, 2008 has been disclaimed.

[21] Appl. No.: 553,416

[22] Filed: Jul. 17, 1990

[30] Foreign Application Priority Data

Jul. 17, 1989 [JP] Japan .................................. 1-184098

[51] Int. Cl.$^5$ ............................................. F16D 13/04
[52] U.S. Cl. .................................... 192/35; 192/58 B; 192/85 A; 192/93 A
[58] Field of Search ............... 192/35, 54, 58 C, 58 B, 192/70.23, 93 A, 85 A

[56] References Cited

U.S. PATENT DOCUMENTS 4,058,027 11/1977 Webb ..................................... 74/711

FOREIGN PATENT DOCUMENTS 0203570 12/1986 European Pat. Off. .
0314420 5/1989 European Pat. Off. .
0391722 10/1990 European Pat. Off. .
3426460 12/1985 Fed. Rep. of Germany .
61-501583 7/1986 Japan .
63-287631 11/1988 Japan .
1206126 8/1989 Japan .
1333878 10/1973 United Kingdom .

Primary Examiner—Alan D. Herrmann
Assistant Examiner—Andrea Pitts
Attorney, Agent, or Firm—Oblon, Spivak, McClelland, Maier & Neustadt

[57] ABSTRACT

A viscous clutch assembly includes a viscous coupling arranged for generating a viscous resistance force in response to relative rotation between a pair of coaxially arranged rotary members, a cam mechanism cooperable with the viscous coupling for converting the viscous resistance force into a thrust force, a friction clutch mechanism cooperable with the cam mechanism to be brought into engagement when applied with the thrust force from the cam mechanism for establishing the drive connection between the rotary members. One of the rotary member is in the form of a cylindrical outer casing and the other rotary member is in the form of an internal rotary member coaxially surrounded by the outer casing. The viscous coupling includes a first rotary fin member fixedly mounted on the internal rotary member for rotation therewith and a second rotary fin member rotatably and axially slidably coupled within the outer casing in a fluid-tight manner for relative rotation with the first rotary fin member and being arranged to form a viscous fluid chamber containing therein the first rotary fin member. The viscous fluid chamber is filled with viscous fluid and air in such a manner as to permit movement of the second rotary fin member toward the first rotary fin member.

7 Claims, 7 Drawing Sheets

VISCOUS CLUTCH ASSEMBLY FOR TORQUE TRANSMISSION IN MOTOR VEHICLE

BACKGROUND OF THE INVENTION

1. Field of the Invention

The present invention relates to a viscous clutch or coupling assembly adapted for installation in torque transmission systems in a motor vehicle for effecting a drive connection between a pair of rotary members coaxially arranged for relative rotation.

2. Discussion of the Prior Art

Conventional viscous coupling assemblies of this kind are classified, in general, into two types. Disclosed in Japanese Patent Laid-open Publication No. 61-501583 is a viscous coupling assembly of the first type which is adapted to automatically effect torque transmission between drive and driven rotary members in response to relative rotation thereof. Disclosed in Japanese Patent Laid-open Publication No. 63-287631 is a viscous coupling assembly of the second type which is adapted as a limited-slip differential to restrict relative rotation between drive and driven rotary members, between a pair of drive rotary members or between a pair of driven rotary members. The viscous coupling assembly of the first type is mainly installed in one of torque transmission systems in a four-wheel drive vehicle of the real-time type. The coupling assembly of the second type is mainly installed in a differential unit.

In the viscous coupling assembly of the first type, torque transmission is effected by shearing force of viscous fluid between the rotary members. Viscous frictional torque caused by the shearing force, however, does not increase so large, and the rising characteristic of viscous frictional torque is not so good. In case the viscous coupling assembly is constructed to generate a large amount of viscous frictional torque, the shearing force is noticeably increased to increase the heating value of viscous fluid. As a result, the viscosity of fluid is greatly lowered to cause fluctuation of the viscous frictional torque. For this reason, there will occur hysteresis in the torque transmission characteristic of the coupling assembly when the difference in rotation between the rotary members is gradually increased and decreased. In the case that the viscous coupling assembly is installed in one of the torque transmission systems or installed as a limited-slip differential in the differential unit, transmission torque or limited-slip torque becomes unstable. This causes undesired influence to running performance of the vehicle.

The viscous coupling assembly of the second type includes a set of rotary members mounted therein for relative rotation to generate viscous frictional torque for torque transmission, cam means cooperable with the rotary members to convert the viscous frictional torque into a thrust force, and a friction clutch cooperable with the cam means to effect the torque transmission when engaged by the thrust force applied thereto from the cam means. Since the rotary members act substantially in the same manner as those in the coupling assembly of the first type, the problems discussed above will remain.

In copending U.S. patent application Ser. No. 07/505,478, filed on Apr. 6, 1990, there has been proposed a viscous clutch assembly the construction of which is designed to solve the problems discussed above. The viscous clutch assembly comprises first means for generating a viscous resistance force in response to relative rotation between a pair of coaxially arranged rotary members, second means cooperable with the first means for converting the viscous resistance force into a thrust force, third means in the form of a clutch mechanism cooperable with the second means to be brought into engagement when applied with the thrust force from the second means for establishing a drive connection between the rotary members, and fourth means cooperable with the first means for increasing and decreasing the viscous resistance force in accordance with a difference in torque between the rotary members.

In such an arrangement of the viscous clutch assembly, the first means is in the form of a viscous coupling which includes a rotary plate arranged for rotation with one of the rotary members and a first cam member rotatably mounted on the one of the rotary members for relative rotation with the rotary plate, the rotary plate being formed at one side thereof with a first set of concentrically spaced annular fins which are coupled with a second set of concentrically spaced annular fins formed on one side of the first cam member through a predetermined quantity of viscous fluid stored between the rotary plate and the first cam member, and the second means is in the form of a cam mechanism which includes a second cam member arranged for rotation with the other rotary member and cooperable with the first cam member for generating a thrust force in accordance with a viscous resistance force acting on the first cam member during relative rotation between the rotary plate and the first cam member.

In the viscous clutch assembly, shearing speed of the viscous fluid increases in accordance with an increase of the difference in rotation between the rotary members, resulting deterioration of the viscosity of fluid. As a result, the increasing rate of transmission torque is lowered in accordance with an increase of the difference in rotation between the rotary members as shown by a characteristic curve I in FIG. 11. Since the characteristic curve I is gradually spaced from a region III where phenomenon of tight corner braking occurs, it becomes difficult to enhance running performance of the vehicle.

SUMMARY OF THE INVENTION

It is, therefore, an object of the present invention to provide an improved viscous clutch assembly capable of increasing the transmission torque in accordance with an increase of the difference in rotation for better running performance of the vehicle.

According to the present invention, the object is attained by providing a viscous clutch assembly adapted for installation in a torque transmission system for effecting a drive connection between a pair of rotary members coaxially arranged for relative rotation, which comprises first means for generating a viscous resistance force in response to relative rotation between the rotary members, second means cooperable with the first means for converting the viscous resistance force into a thrust force, third means in the form of a clutch mechanism cooperable with the second means to be brought into engagement when applied with the thrust force from the second means for establishing the drive connection between the rotary members, wherein one of the rotary members is in the form of a cylindrical outer casing and the other rotary member is in the form of an internal rotary member coaxially surrounded by the outer casing, and wherein the first means is in the form of a viscous coupling including a first rotary fin member fixedly mounted on the internal rotary member for rotation therewith and a second rotary fin member rotatably and axially slidably coupled within the outer casing in a fluid-tight manner for relative rotation with the first rotary fin member and being arranged to form a viscous fluid chamber containing therein the first rotary fin member, the first rotary fin member being formed at one side thereof with a first set of concentrically spaced annular fins which are coupled with a second set of concentrically spaced annular fins formed on one side of the second rotary fin member, and the viscous fluid chamber being filled with an amount of air and a predetermined amount of viscous fluid in such a manner as to permit movement of the second rotary fin member toward the first rotary fin member.

In a preferred embodiment of the present invention, the second means is in the form of a cam mechanism including a first cam member integral with the second rotary fin member and a second cam member axially slidably coupled within the outer casing for rotation therewith and cooperable with the first cam member for generating a thrust force in accordance with a viscous resistance force acting on the first cam member during relative rotation between the first and second rotary fin members.

BRIEF DESCRIPTION OF THE DRAWINGS

Other objects, features and advantages of the present invention will be readily appreciated from the following detailed description of preferred embodiments thereof when considered with reference to the accompanying drawings, in which.

DESCRIPTION OF THE PREFERRED EMBODIMENTS

Figure 1:
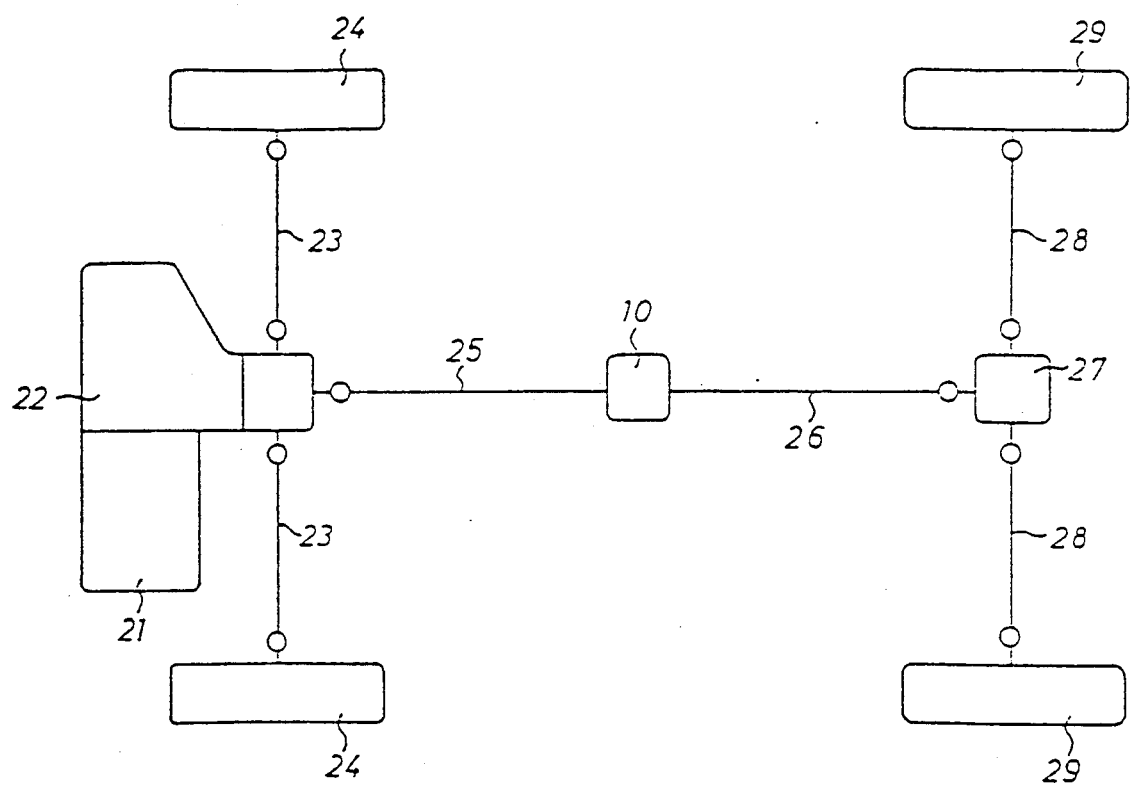
FIG. 1 is a schematic plan view of the arrangement of a four-wheel drive vehicle system incorporating a viscous clutch assembly of the present invention.

In FIG. 1 of the drawings, there is schematically illustrated a four-wheel drive vehicle of the real-time type the rear wheel drive system of which includes a viscous clutch assembly 10 of the present invention. The vehicle has a transversely mounted front engine 21 and a transaxle transmission unit 22 secured to one side of engine 21. The transaxle transmission unit 22 includes a power transmission having an input shaft (not shown) drivingly connected to an output shaft of engine 21 through a clutch mechanism (not shown) and a power transfer device arranged to transfer the drive power from the power transmission to a pair of front axle shafts 23 and to a first longitudinal front-to-rear propeller shaft 25. The front axle shafts 23 are connected at their outer ends to a pair of front drive wheels 24, while the propeller shaft 25 is drivingly connected to a second longitudinal front-to-rear propeller shaft 26 by means of the viscous clutch assembly 10. The second propeller shaft 26 is connected to a rear differential 27 by means of universal joint means. The rear differential 27 is drivingly connected to a pair of split rear axle shafts 28 to provide conventional differential action between a pair of rear drive wheels 29.

Figure 2:
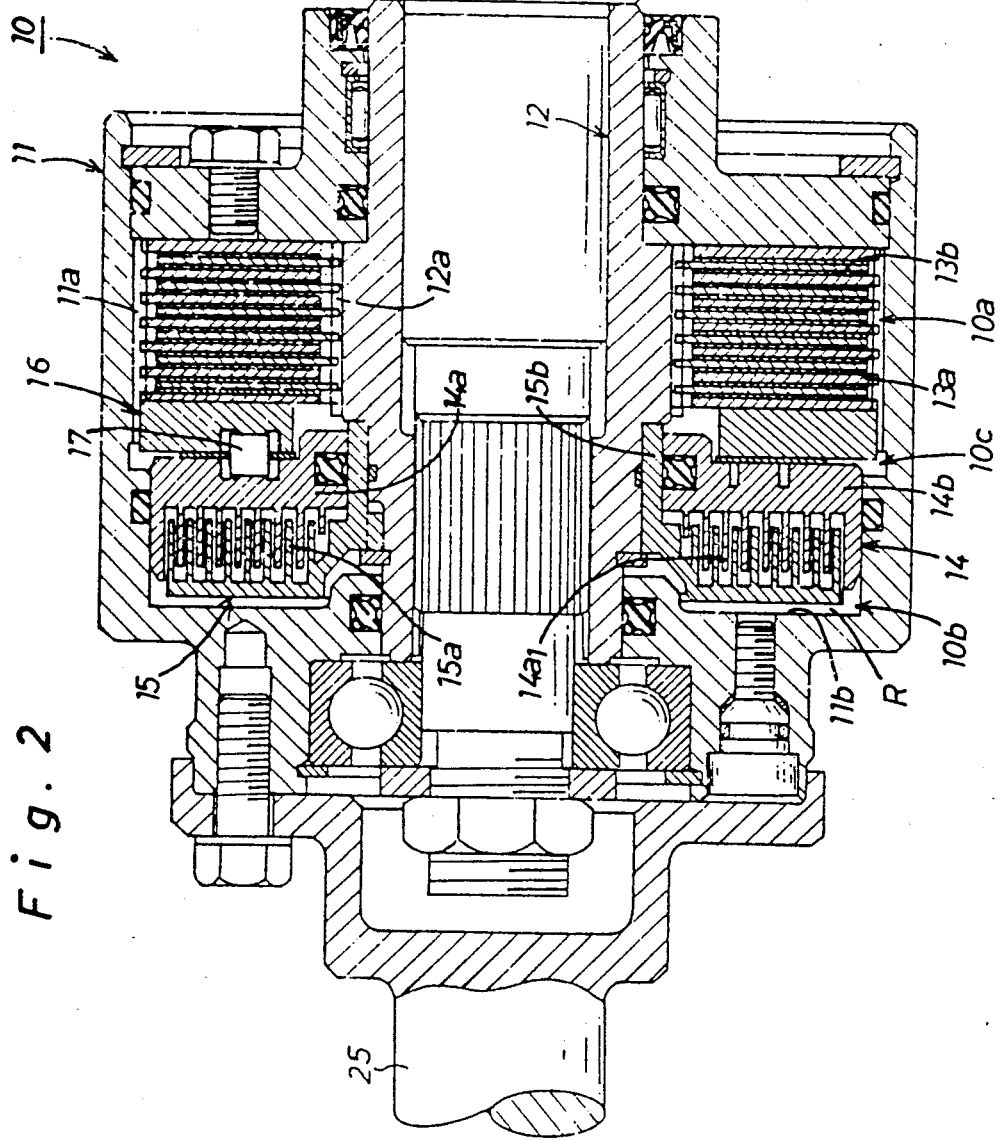
FIG. 2 is a sectional view of the viscous clutch assembly shown in FIG. 1.

As shown in FIG. 2, the viscous clutch assembly 10 includes an outer cylindrical casing 11 arranged in surrounding relationship with an inner sleeve member 12 to contain therein a friction clutch mechanism 10a for effecting a drive connection between the propeller shafts 25 and 26, a viscous coupling 10b for generating a viscous resistance force, and a cam mechanism 10c cooperable with the viscous coupling 10b for generating a thrust force. The outer cylindrical casing 11 is connected to the rearward end of first propeller shaft 25 by means of a plurality of bolts for rotation therewith, while the inner sleeve member 12 is splined to the forward end portion of second propeller shaft 26 for rotation therewith.

The friction clutch mechanism 10a is in the form of a multiple disc clutch mechanism of the wet type which includes a first set of clutch discs 13a splined at 11a to an internal wall of outer casing 11 for rotation therewith and a second set of clutch discs 13b splined at 12a to the inner sleeve member 12 for rotation therewith. The clutch discs 13a are interleaved with the clutch discs 13b to be brought into engagement with the latter when applied with the thrust force from the cam mechanism 10c. A chamber formed between the outer casing 11 and inner sleeve member 12 is filled with a predetermined amount of clutch fluid.

The viscous coupling 10b is contained within a viscous fluid chamber R formed between an internal end wall 11b of outer casing 11 and a first cam member 14 rotatably and axially slidably coupled within the outer casing 11 in a fluid-tight manner. The viscous coupling 10b includes a first rotary fin member 15 fixedly mounted on the inner sleeve member 12 for rotation therewith and a second rotary fin member 14a integrally formed with a body portion 14b of first cam member 14. The first rotary fin member 15 is formed with a first set of concentically spaced annular fins 15a which are coupled with a second set of concentrically spaced annular fins 14a₁ formed on the left side of the second rotary fin member 14a. The first cam member 14 is rotatably and axially slidably mounted on a cylindrical hub portion 15b of rotary fin member 15 in a fluid-tight manner. The first set of concentrically spaced annular fins 15a are axially overlapped with the second set of concentrically spaced annular fins 14a₁ in a predetermined distance. In addition, the viscous fluid chamber R is filled with an amount of air and a predetermined amount of high viscous fluid such as silicon oil.

Figure 4A:
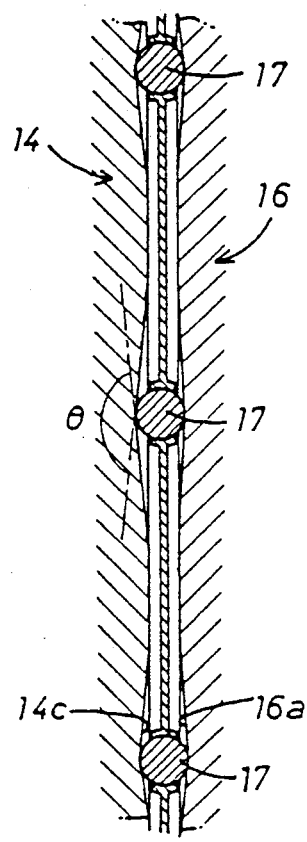
FIGS. 4, 4(a), 4(b) and 4 (c) each are an enlarged sectional view illustrating the mode of operation of the mechanism shown in FIG. 2.
Figure 4B:
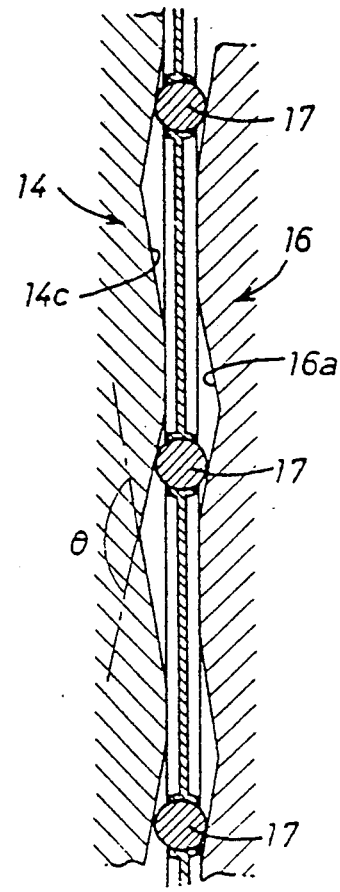
Figure 4C:
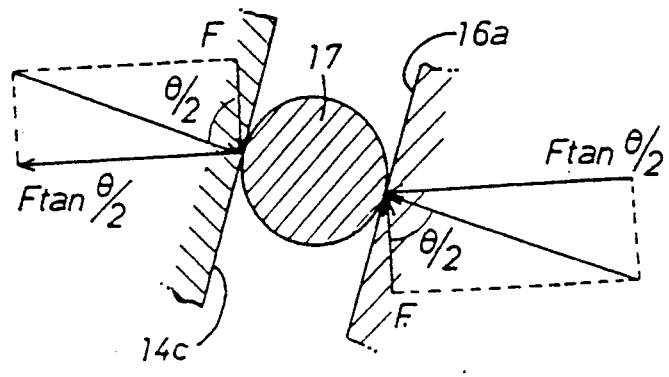

The cam mechanism 10c includes a second cam member 16 cooperable with the first cam member 14 and a plurality of circumferentially spaced follower rollers 17. The second cam member 16 is located between the first cam member 14 and the leftmost clutch disc 13a and is in the form of an annular thrust plate axially slidably coupled with the outer casing 11 for rotation therewith. As shown in FIGS. 4 (a) and (b), the first cam member 14 is formed at its right side with an annular cam groove 14c which faces a corresponding annular cam groove 16a formed on the left side of second cam member 16. The annular cam grooves 14c and 16a each have a plurality of crests and roots with a cam pressure angle θ. The follower rollers 17 are each disposed in a space between the opposed roots of cam grooves 14c and 16a and carried rotatably by means of an annular retainer plate between the cam members 14 and 16.

In operation, the outer casing 11, cam members 14, 16 and clutch discs 13a rotate with the first propeller shaft 25, while the inner sleeve member 12, rotary fin member 15 and clutch discs 13b rotate with the second propeller shaft 26. When the first propeller shaft 25 rotates at a different speed than the second propeller shaft 26, relative rotation between the first and second fin members 15 and 14a will occur to generate a viscous shearing torque T as represented by the following equation.

$$T = K \cdot \frac{\mu \cdot N \cdot l}{h} \sum_{i=1}^{n} (ri)^3$$

where K is constant, μ is the fluid viscosity, N is the difference in rotation, l is the axial length of the overlapped portions of annular fins 15a and 14a₁, h is the space between annular fins 15a and 14a₁, and ri is each radius of portions at which the viscous shearing force is generated.

The viscous shearing torque T acts as a resistance force F on the first cam member 14 to restrict relative rotation between the first and second cam members 14 and 16. The resistance force F is represented by F=T/R where R is an arrangement radius of follower rollers 17. As shown in FIG. 4 (c), the resistance force F is converted into a thrust force S=F tan η/2 by means of the cam mechanism 10c. When applied with the thrust force S, the second cam member 16 is moved as shown in FIG. 4 (b) to bring the clutch discs 13a into frictional engagement with the clutch discs 13b. As a result, a drive connection between the outer casing 11 and inner sleeve member 12 is established to transfer the drive power from the first propeller shaft 25 to the second propeller shaft 26 thereby to effect the four-wheel drive mode of the vehicle.

Figure 3:
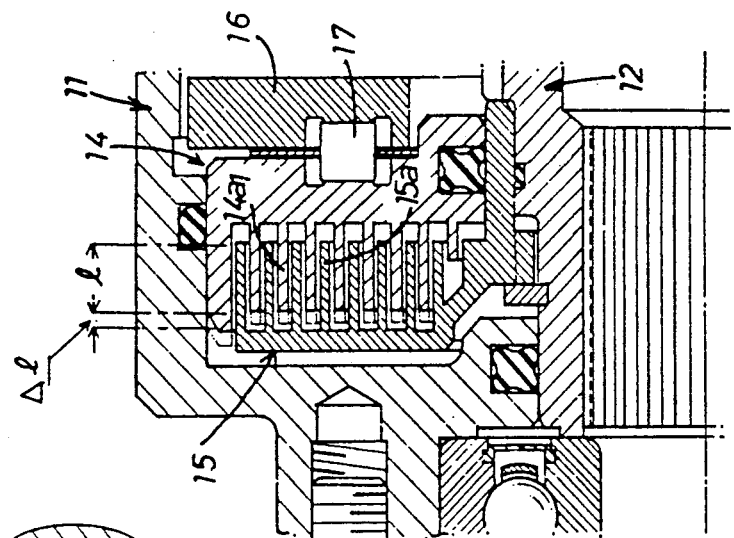
FIGS. 3 a partly enlarged sectional view of a cam mechanism shown in FIG. 2.
Figure 8:
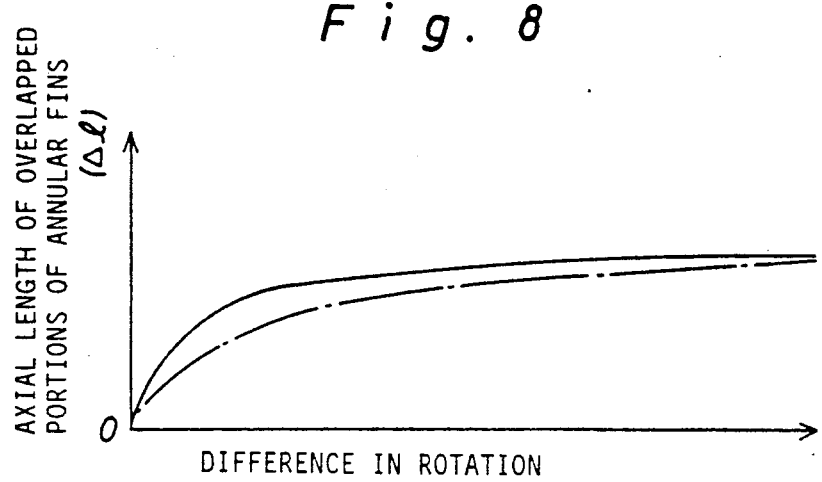
FIG. 8 is a graph showing a relationship between a difference in rotation and an increased amount of overlapped portions of annular fins shown in FIG. 3.
Figure 9:
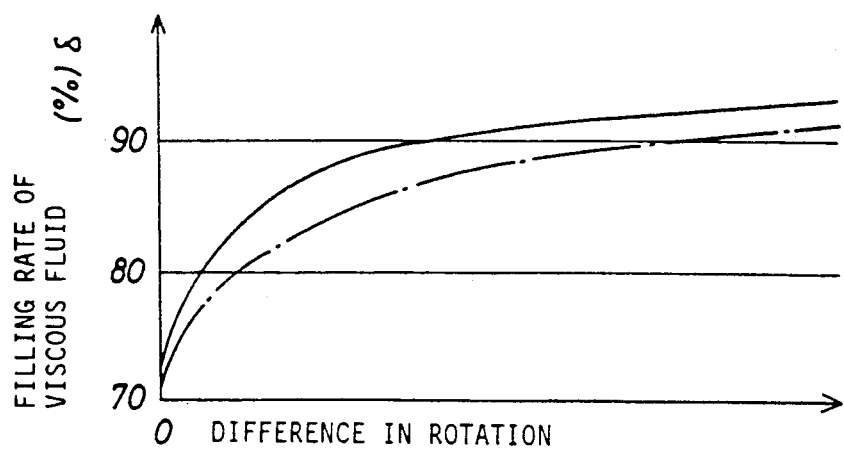
FIG. 9 is a graph showing the filling rate of viscous fluid in relation to the difference in rotation shown in FIG. 8.
Figure 10:
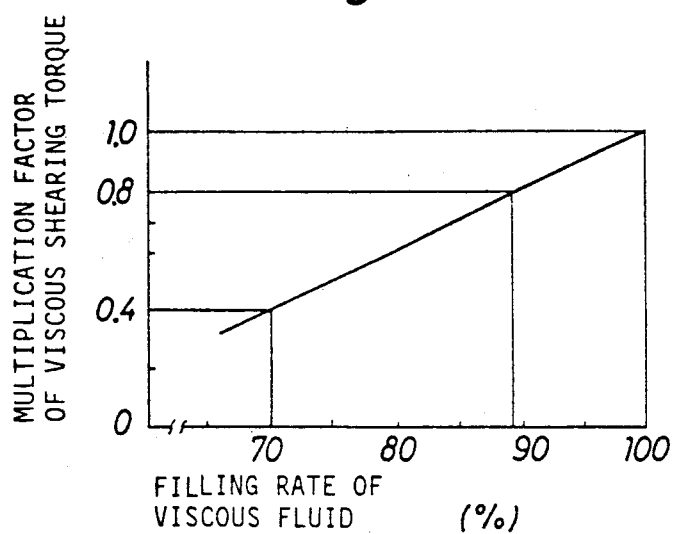
FIG. 10 a graph showing a multiplication factor of viscous shearing torque in relation to the filling rate of viscous fluid shown in FIG. 9.
Figure 11:
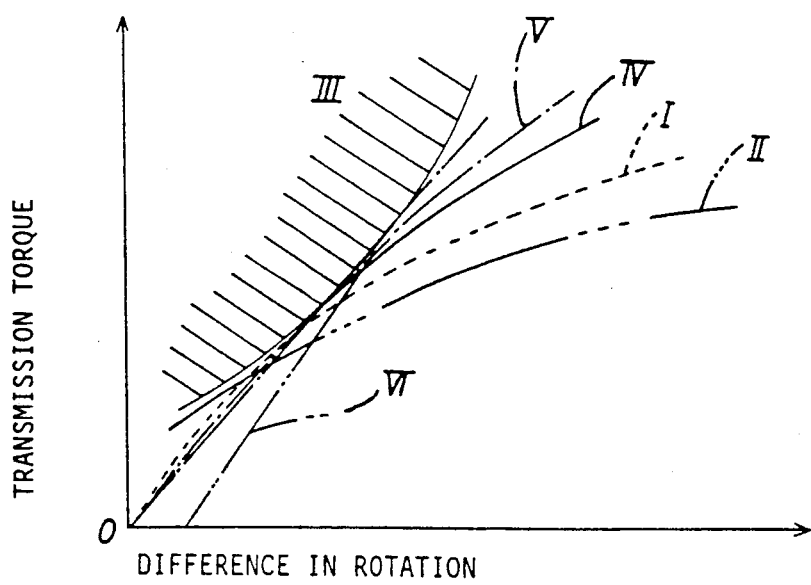
FIG. 11 is a graph showing transmission torque in relation to the difference in rotation shown in FIG. 8.

During the operation described above, the first cam member 14 is moved leftward in a distance is as shown by imaginary lines in FIG. 3 to compress the air in viscous fluid chamber R. Thus, as shown by a solid curve in FIG. 8, the overlapped portions of annular fins 15a 10 and 14a₁ are increased in an axial direction in accordance with an increase of the relative rotation between the outer casing 11 and inner sleeve member 12, and as shown by a solid curve in FIG. 9, the filling rate δ of viscous fluid is increased in accordance with an increase of the relative rotation between outer casing 11 and inner sleeve member 12. As is understood from the graphs of FIGS. 8 and 9, the viscous shearing torque T increases in proportion to the axial length of overlapped portions of annular fins 15a, 14a₁ and to the filling rate δ of viscous fluid in chamber R. Thus, the multiplication factor of viscous shearing torque increases in proportion to the filling rate of viscous fluid in chamber R, as shown in FIG. 10. This is effective to restrain a decrease of the viscous shearing force caused by deterioration of fluid viscosity. Consequently, the transmission torque between propeller shafts 25 and 26 is controlled as shown by a characteristic curve IV in FIG. 11.

Figure 6:
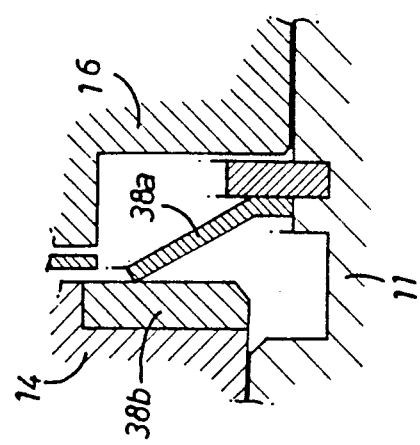
FIG. 6 is a partly enlarged sectional view of the modification shown in FIG. 5.
Figure 5:
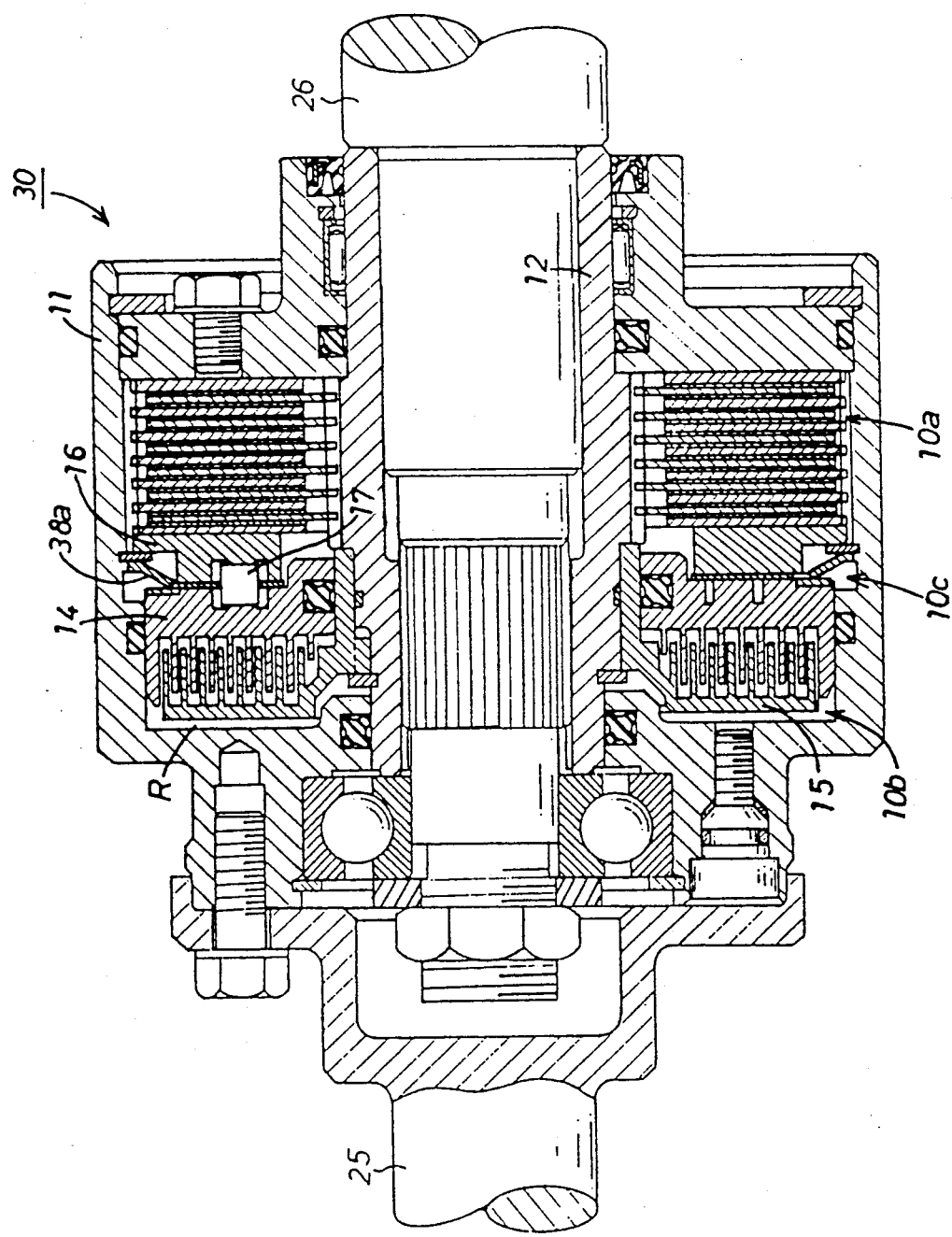
FIG. 5 is a sectional view of a modification of the viscous clutch assembly shown in FIG. 2.

Disclosed in FIG. 5 is a modification of the viscous clutch assembly 10 shown in FIG. 2. In this modified viscous clutch assembly 30, an annular dish spring 38a is assembled within the outer casing 11 to bias the first cam member 14 toward the viscous fluid chamber R. As shown in FIG. 6, the first cam member 14 is integrally provided at its right side with an annular retainer 38b for engagement with the annular dish spring 38a. In a practical embodiment of the present invention, the annular retainer 38b may be replaced with a needle bearing. Other construction and component parts are substantially the same as those of the viscous clutch assembly 10 shown in FIG. 2

In the modified viscous clutch assembly 30, the initial pressure in viscous fluid chamber R is increased by the biasing force of dish spring 38a to be higher than that in the viscous clutch assembly 10 shown in FIG. 2. Thus, as shown by a dot and dash curve respectively in FIGS. 8 and 9, the axial length of overlapped portions of annular fins 15a, 14a₁ and the filling rate δ of viscous fluid in relation to the difference in rotation between propeller shafts 25, 26 are defined to be slightly lower than those in the viscous clutch assembly 10 shown in FIG. 2. Consequently, the transmission torque in relation to the difference in rotation between propeller shafts 25, 26 becomes linear as shown by a characteristic line V in FIG. 11.

Figure 7:
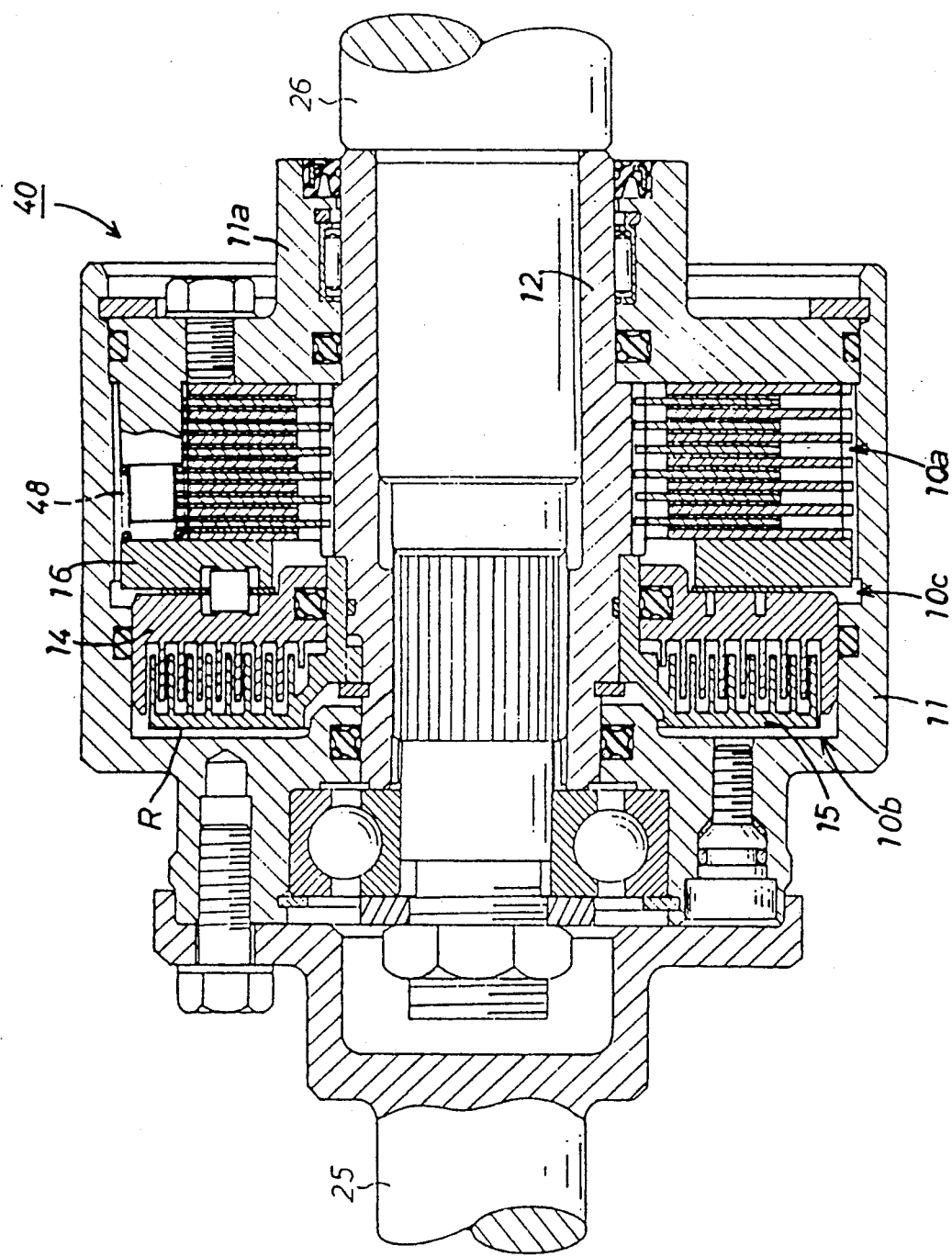
FIG. 7 is a sectional view of another modification of the viscous clutch assembly shown in FIG. 2.

Disclosed in FIG. 7 is another modification of the viscous clutch assembly 10 shown in FIG. 2. In this modified viscous clutch assembly 40, a plurality of circumferentially spaced coil springs 48 are arranged in surrounding relationship with the friction clutch mechanism 10a and disposed between the second cam member 16 and an end wall member 11a of outer casing 11 to bias the first and second cam members 14 and 16 toward the viscous fluid chamber R. Thus, the biasing force of coil springs 48 acts to increase the initial pressure in viscous fluid chamber R higher than that in the viscous clutch assembly 10 shown in FIG. 2 and to restrict movement of the second cam member 16 toward the friction clutch assembly 10a. As a result, the transmission torque in relation to the difference in rotation between propeller shafts 25 and 26 is obtained at a higher level as shown by a characteristic line VI in FIG. 11.

Having now fully set forth both structure and operation of preferred embodiments of the concept underlying the present invention, various other embodiments as well as certain variations and modification of the embodiments shown and described herein will obviously occur to those skilled in the art upon becoming familiar with said underlying concept. It is to be understood, therefore, that within the scope of the appended claims, the invention may be practiced otherwise than as specifically set forth herein.

What is claimed is:

1. A viscous clutch assembly in a torque transmission system for effecting a drive connection between a pair of rotary members coaxially arranged for relative rotation, said viscous clutch assembly comprising first means for generating a viscous resistance force in response to relative rotation between said rotary members, second means cooperable with said first means for converting the viscous resistance force into a thrust force, third means in the form of a clutch mechanism cooperable with said second means to be brought into engagement when applied with the thrust force from said second means for establishing the drive connection between said rotary members, wherein one of said rotary members is in the form of a cylindrical outer casing and another of said rotary members is in the form of an internal rotary member coaxially surrounded by said outer casing, and wherein said first means includes a first rotary fin member fixedly mounted on said internal rotary member for rotation therewith and a second rotary fin member rotatably and axially slidably coupled within said outer casing in a fluid-tight manner for relative rotation with said first rotary fin member and being arranged to form a viscous fluid chamber containing therein said first rotary fin member, said first rotary fin member being formed at one side thereof with a first set of concentrically spaced annular fins which are coupled with a second set of concentrically spaced annular fins formed on one side of said second rotary fin member, and said viscous fluid chamber being filled with an amount of air and a predetermined amount of viscous fluid in such a manner as to permit movement of said second rotary fin member toward said first rotary fin member.

2. A viscous clutch assembly as claimed in claim 1, wherein said second means is in the form of a cam mechanism including a first cam member integral with said second rotary fin member and a second cam member axially slidably coupled within said outer casing for rotation therewith and cooperable with said first cam member for generating a thrust force in accordance with a viscous resistance force acting on said first cam member during relative rotation between said first and second rotary fin members.

3. A viscous clutch assembly as claimed in claim 2, wherein resilient means is assembled within said outer casing to bias said first cam member toward said first rotary fin member.

4. A viscous clutch assembly as claimed in claim 3, wherein said resilient means comprises an annular dish spring engaged at one end thereof with an internal wall of said outer casing and at another end thereof with said first cam member.

5. A viscous clutch assembly as claimed in claim 2, wherein resilient means is assembled within said outer casing to bias said second cam member toward said first cam member.

6. A viscous clutch assembled as claimed in claim 5, wherein said resilient means comprises a plurality of coil springs arranged in surrounding relationship with said clutch mechanism and being engaged at their one ends with an end wall of said outer casing and at their other ends with said second cam member.

7. A viscous clutch assembly as claimed in claim 1, wherein said first, second and third means are housed coaxially in an annular space between said outer casing and said internal rotary member.

* * * * *